Patented Sept. 5, 1950

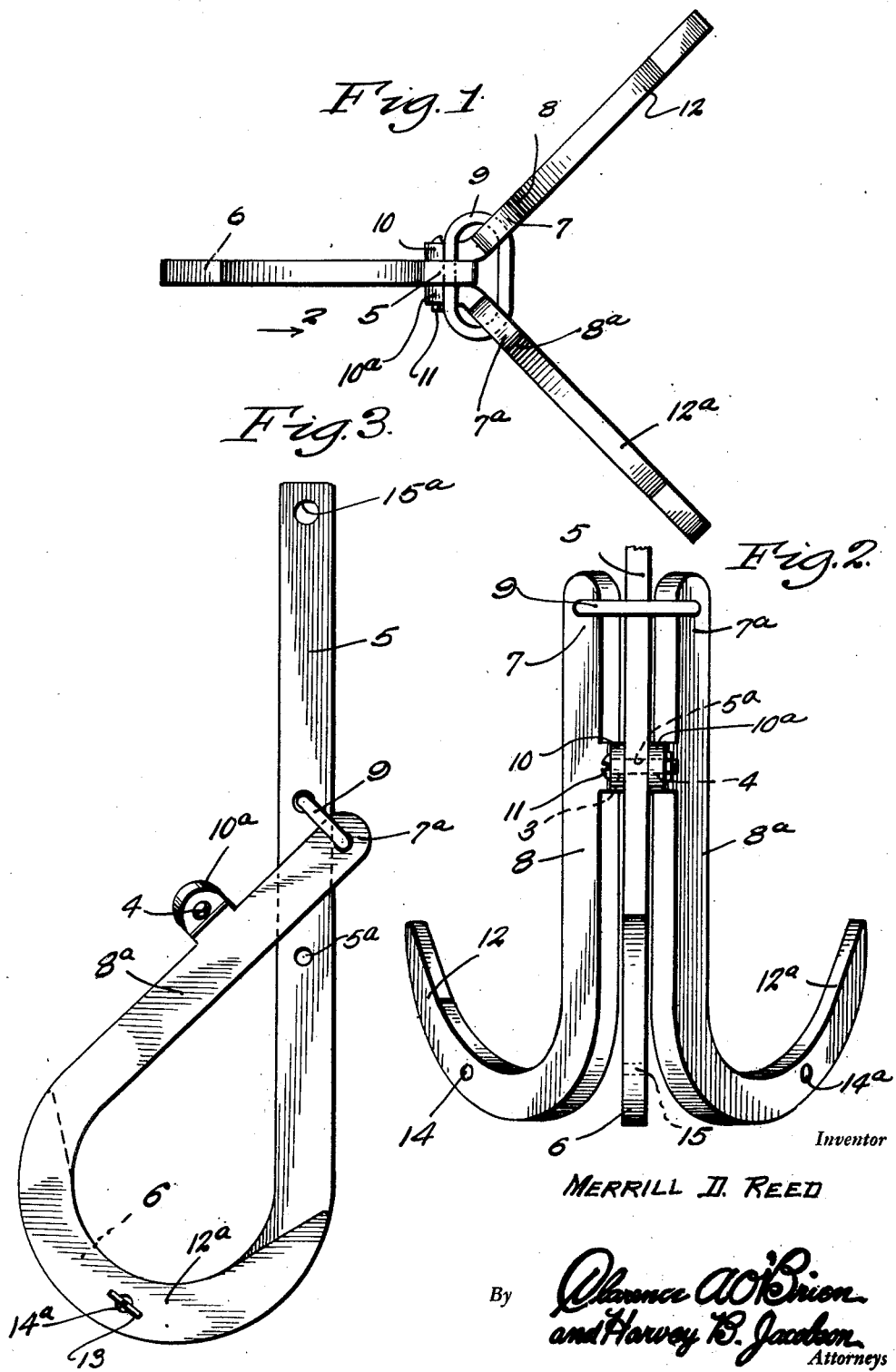

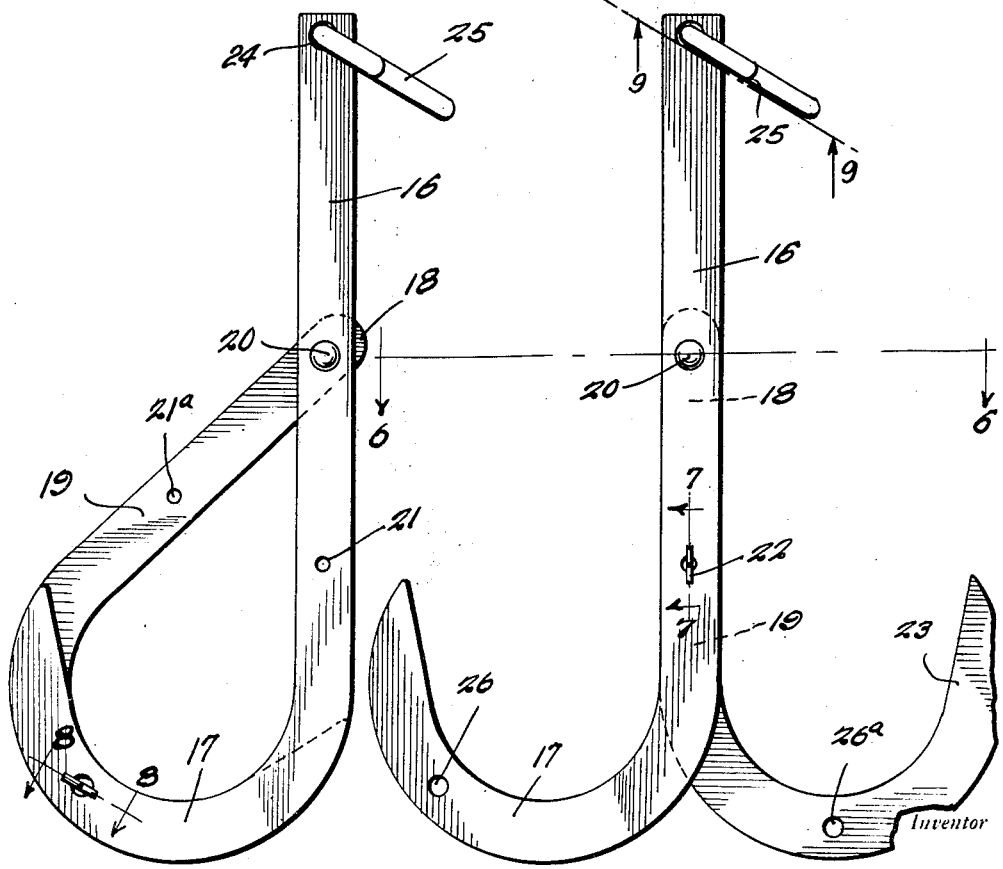

2,521,537

UNITED STATES PATENT OFFICE 2,521,537

DRAGGING HOOK FOR TRAPS

Merrill D. Reed, Covelo, Calif.

Application November 27, 1946, Serial No. 712,662

3 Claims. (Cl. 43—96)

This invention relates to new and useful improvements in hooks and more particularly to a hook adapted for animal traps to prevent dragging of the trap by an animal when caught in the trap.

The primary feature of this invention is to provide a device of the character referred to that is conveniently and safely carried by man or animal.

Another feature of this invention is to provide a hook of this character that is easily converted into a small article having no sharpened edges protruding therefrom whereby the device is portable without injury to persons carrying same.

A further important feature of this invention is to provide a device which is quickly assembled to form a hook for anchoring a trap or the like to prevent dragging of said trap by an animal.

A still further feature of this invention is to provide a device of the character referred to that is strong and durable in construction, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1 is a top plan view of the hook constructed in accordance with the present invention.

Figure 2 is a side elevational view.

Figure 3 is an enlarged side elevational view showing the device assembled in a safe or closed position for carrying.

Figure 4 is a side elevational view of the hook in slightly modified construction.

Figure 5 is a side elevational view showing the modified hook assembled in a safe or closed position for carrying.

Figure 6 is a sectional view of the modified hook taken on line 6—6 of Figure 4.

Figure 7 is a sectional fragmentary view of the modified hook taken on line 7—7 of Figure 4.

Figure 8 is a sectional fragmentary view of the modified hook taken on line 8—8 of Figure 5.

Figure 9 is a sectional view of the modified hook taken on line 9—9 of Figure 4.

Referring now to the drawings in detail, and first with respect to the form of the invention shown in Figures 1 to 3, inclusive, the numeral 5 represents a main shank having its lower end curved upwardly to form the main bill portion 6.

The upper ends 7 and 7a of a pair of auxiliary shanks 8 and 8a are loosely connected by a closed link 9 to bar 5, thereby preventing said shanks 7 and 7a from becoming disassembled from bar 5.

Extending outwardly from one edge of said shanks 7 and 7a are tongues 10 and 10a which are adapted to bear on opposite sides of shank 5 and are held thereto by a bolt and nut 11 placed through opposed openings 3 and 4 in tongues 10 and 10a and the opening 5a in shank 5.

The lower ends of shanks 7 and 7a are formed into bill portions 12 and 12a which are adapted to face outwardly in an inclined direction from bill 6, as shown clearly in Figure 1.

In order to make the device compact and safe for carrying, bolt and nut 11 are removed and bills 12 and 12a are swung inwardly to bear against the respective outer faces of bill 6 in an overlapping or closed position. A cotter pin 13 is placed through opposing openings 14 and 14a in bills 12 and 12a and opening 15 in bill 6, as shown in Figure 3.

At the upper end of shank 5, an opening 15a is provided which is adapted to receive a chain, rope or the like (not shown) for attaching said device to a trap (not shown), the bill portions of the device digging into the ground to function as an anchor to prevent dragging of the trap by an animal caught therein.

In Figures 4 through 9, inclusively, the hook is shown in modified construction, wherein the numeral 16 represents a main shank having its lower end formed into a bill portion 17 and the numeral 19 represents an auxiliary shank having its lower end formed with a bill portion 23.

The upper end 18 of auxiliary shank 19 is pivotally connected as at 20 to said shank 16, and a pair of opposing holes 21 and 21a are drilled respectively in shanks 16 and 19 and are adapted to receive a cotter pin 22 for holding shank 19 inclined with and against shank 16 with said bill portion 17 and bill portion 23 of said auxiliary shank extending outwardly from each other as shown in Figure 4.

The upper end of shank 16 is provided with an opening 24 which is adapted to receive a link 25 having eyes 25a at each end, said link being adapted for engagement by a chain or the like (not shown), for attaching to a trap.

In order to make the modified hook compact and in a safe position for carrying or shipping, cotter pin 22 is removed from shanks 16 and 19 and shank 19 is swung rearwardly until bill 23 rests against bill 17 and an opening 26 in bill 17 opposes an opening 26a in bill 23. The cotter pin is then placed through said openings, as clearly shown in Figure 5.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claims.

What I claim is:

1. A device of the class described, comprising a main shank having a bill portion at its lower end, a closed link loosely carried by said main shank, a plurality of auxiliary shanks loosely connected on said link, the lower ends of said auxiliary shanks provided with bill portions, a tongue extending outwardly from one side of said auxiliary shanks, a fastening device rigidly connecting the tongues of said auxiliary shanks to said main shank, with the bill portions of said auxiliary shanks and main shanks pointing outwardly from each other in diverging relationship in an open position, said bills being swingable into a closed inwardly extending opposed position overlapping each other, and fastening means for rigidly attaching said bill portions to each other in a closed position.

2. A device of the class described comprising a main shank having a bill portion at its lower end, a closed link loosely carried by said main shank, a pair of auxiliary shanks loosely carried on said link, the lower ends of said auxiliary shanks having bill portions, a tongue extending outwardly from one side of said auxiliary shanks, fastening means rigidly connecting the tongues of said auxiliary shanks to said main shank in an open position with said bill portions of said auxiliary shanks and said bill portion of said main shank pointing outwardly from each other in diverging relationship, said bill portions of the auxiliary shanks being swingable against opposite sides of the bill of the main shank in an inwardly extending opposed overlapping closed position, and means rigidly connecting said bill portions of said main shank in a closed position.

3. A device of the class described comprising a plurality of hooks, each including a shank and a bill, means swingably connecting the shanks to each other for reversible movement of the bills into either an open position with the shanks parallel to each other and with the respective bills extending outwardly from each other, or into a closed position with at least one of the shanks inclined from the longitudinal axis of a second shank and with the bills overlapping each other, said shanks having aligned openings when the bills are open, a removable fastener positioned in said openings to hold the bills in open position, said bills having aligned openings when in closed position, and a removable fastener positioned in said last named openings holding the bills closed.

MERRILL D. REED.

REFERENCES CITED

The following references are of record in the file of this patent:

UNITED STATES PATENTS

| Number | Name | Date |
|---|---|---|
| 261,749 | Morris | July 25, 1882 |
| 1,305,175 | Smith | May 27, 1919 |
| 1,507,706 | Miller et al. | Sept. 9, 1924 |
| 1,918,119 | McPheeters | July 11, 1933 |
| 2,202,856 | Hottel | June 4, 1940 |